Oct. 26, 1971  S. S. HARRIS  3,615,105
MOTORCYCLE HITCH
Filed June 18, 1969

INVENTOR.
SAMUEL STEVEN HARRIS
BY
Woodard, Weikart, Emhardt & Naughton
ATTORNEYS

United States Patent Office 3,615,105
Patented Oct. 26, 1971

3,615,105
MOTORCYCLE HITCH
Samuel Steven Harris, Rte. 1, Selma, Ind. 47383
Filed June 18, 1969, Ser. No. 834,257
Int. Cl. B62d 53/04
U.S. Cl. 280—292                                    5 Claims

ABSTRACT OF THE DISCLOSURE

A motorcycle hitch replacing the ball of the trailer hitch on an automobile. The motorcycle hitch includes a cylindrical tube which is fixed to the front fork of the motorcycle by the front axle bolt of the motorcycle after the front wheel of the motorcycle has been removed. A bolt has its head welded to the central portion of the tube and, along with a lock washer, fixes the tube to the trailer hitch.

BACKGROUND OF THE INVENTION

Field of the invention

This invention relates to a motorcycle hitch.

Description of the prior art

Various types of motorcycle hitches are known in the art for attaching motorcycles to the rear of automobiles for towing of the motorcycles. Examples of such prior art hitches are disclosed in the U.S. patents to Zumwalt 2,789,832, McCance 3,428,332 and Jones 3,430,983. In many cases such prior art devices attach the front wheel of the motorcycle to the rear of the automobile, for example, by cradling the front tire or by clamping it. Such procedures do not provide an entirely satisfactory arrangement because of the difficulty of attaching the soft flexible rubber of the tire to the towing vehicle in such a fashion that it will remain connected when subjected to rough roads during towing. In the past guy wires have been used in an effort to solve this problem but without complete success. Thus, in many cases, the guy wires will prevent the motorcycle from becoming detached from the vehicle but will not prevent damage to the motorcycle if the front tire comes out of its cradle while the towing vehicle is moving at highway speeds. The present invention does not necessarily eliminate the desirability of using guy wires but it does improve the possibility of effecting a durable mounting of the motorcycle on the towing vehicle.

SUMMARY OF THE INVENTION

One embodiment of this invention includes apparatus for towing a motorcycle behind a vehicle comprising a first element fixed to the rear of the vehicle and providing an opening which extends transversely of said vehicle, said motorcycle having a front wheel and a front fork for mounting thereof and having its front wheel removed from its front fork, and fastener means extending through said opening and fixing said front fork to said first element.

Objects of this invention are to provide an improved motorcycle hitch and to provide motorcycle towing apparatus which reduces the possibility of the motorcycle becoming detached from the towing vehicle during towing.

DESCRIPTION OF THE PREFERRED EMBODIMENT

Figure 1:
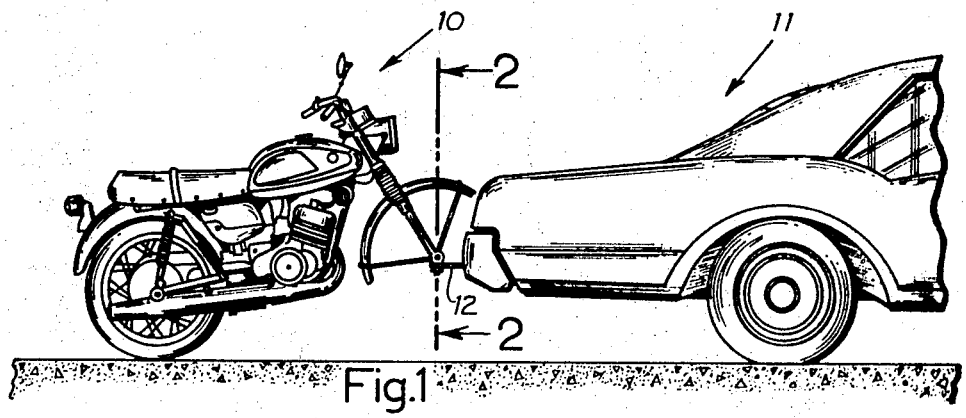
FIG. 1 is a side elevation of a towing vehicle and a motorcycle being towed by the vehicle according to the present invention.

Referring now more particularly to the drawings, there is illustrated a motorcycle 10 and a towing vehicle 11. The motorcycle 10 has its front wheel removed and is attached to the trailer hitch 12 of the towing vehicle. The trailer hitch 12 has an aperture therethrough sized to receive the threaded portion 15 of the bolt 16. In normal use the trailer hitch 12 will have a ball mounted in the aperture 14 for conventional towing of a trailer. This ball, however, is removed for using the motorcycle hitch 17 of the present invention.

Figures 2, 3:
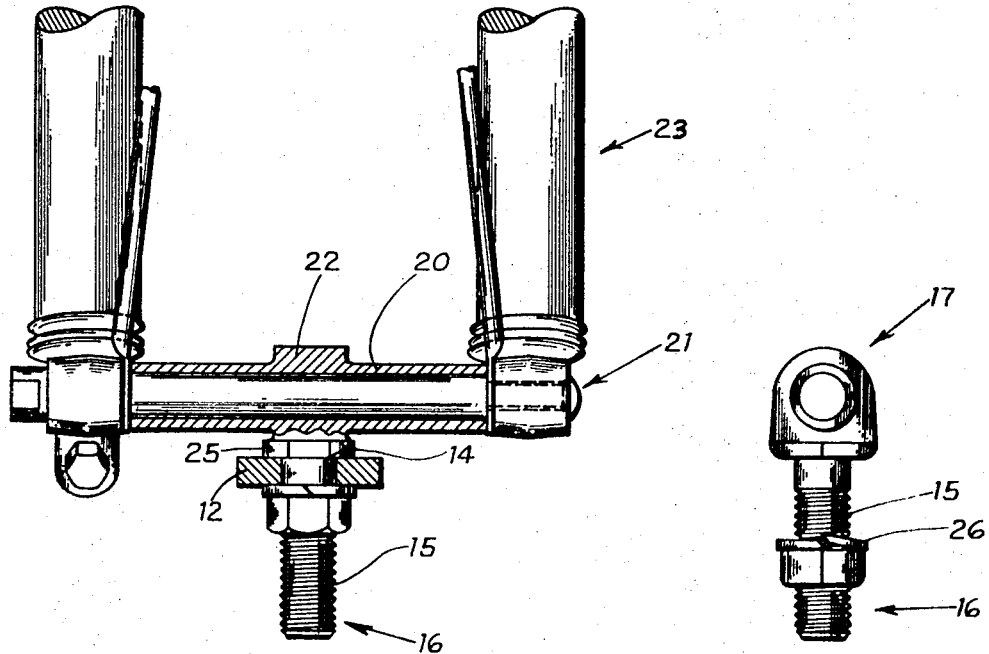
FIG. 2 is an enlarged vertical section taken along the line 2—2 of FIG. 1 in the direction of the arrows.
FIG. 3 is a side elevation of the motorcycle hitch of the present invention.

As shown in FIGS. 2 and 3, the motorcycle hitch 17 includes a tubular member 20 which is internally and externally cylindrical. The configuration of the tubular member 20 preferably approaches the configuration of the central portion of the front wheel of the motorcycle so that mounting of the tubular portion 20 in place of the front wheel of the motorcycle is easily effected by the use of the standard axle bolt 21 of the motorcycle. In order to use the present device, the front wheel of the motorcycle is removed and placed, for example, in the trunk of the towing vehicle 11. The motorcycle hitch 17 is secured to the trailer hitch 12 as shown in detail in FIG. 2 and the front fork 23 of the motorcycle is attached as shown to the tubular member 20.

In the illustrated embodiment, the bolt 16 is welded to the tubular member or channel 20. This welding can be effected by the use of a length of bar stock 22 which surrounds and cups the tubular member 20 and the head 25 of the bolt 16. The weld can then be effected between the bar stock 22 and the tubular member 20 and the head 25 of the bolt 16. In mass production techniques, attachment of the threaded member 16 to the tubular member 20 can be effected in other ways. The threaded member 16, however, should be fixed to the tubular member 20 so as to extend perpendicularly thereof centrally of the length of the tubular member 20.

To aid in firm attachment of the threaded member 16 to the trailer hitch 12 a lock washer 26 is used. The attachment is made in such a way that the tubular member 20 has its axis extending transversely of the front to rear direction of the towing vehicle 11. It has been found that the present invention provides an improved motorcycle towing apparatus which reduces the possibility of the motorcycle becoming detached from the towing vehicle during towing.

Articulation in the hitch between the towing vehicle and the motorcycle occurs only about the transverse horizontal axis of the axle bolt 21 and tubular member 20 due to the relative movements permitted therebetween. There is however normal articulation of the motorcycle rear portion about the substantially upright axis of the steering post during turns.

What is claimed is:

1. Apparatus for towing a motorcycle behind a vehicle comprising a first element fixed to the rear of the vehicle and providing a channel which extends transversely of said vehicle, said motorcycle having a front wheel and a front fork for mounting thereof and having its front wheel removed from its front fork, and fastener means extending through said channel positioned between said fork and fixing said front fork to said first element.

2. The apparatus of claim 1 wherein said first element comprises a tubular member, a threaded member fixed to said tubular member and projecting perpendicularly thereof, a trailer hitch having an aperture therethrough and fixed to said vehicle, said threaded member extending through said trailer hitch aperture, and a nut fixing said threaded member to said trailer hitch.

3. The apparatus of claim 2 wherein said tubular member is externally cylindrical and has a cylindrical opening therethrough; said fastener means comprising a bolt extending through said cylindrical opening and front fork and firmly fixing said front fork to said cylindrical member; and a lock washer received on said threaded member and, along with said nut, firmly fixing said threaded member to said trailer hitch.

4. The combination of:
a towing vehicle having a trailer hitch;
a bolt having a head and threaded shank, said shank extending through said hitch and being secured thereto positioning said head atop said hitch;
a tubular member mounted perpendicularly atop said head, said member having a length extending transversely of the front to rear direction of said vehicle with said head being positioned centrally of said length;
a motorcycle having front forks with a front wheel removed; and,
an axle bolt connecting said forks to said tubular member.

5. The combination of claim 4 wherein:
said axle bolt extends through said forks and said tubular member; and further comprising:
a bar stock welded to said head, said stock surrounding said tubular member and being welded thereto.

References Cited
UNITED STATES PATENTS 2,436,485  2/1948  Roxy _____ 280—402
2,789,832  4/1957  Zumwalt _____ 280—402 X LEO FRIAGLIA, Primary Examiner U.S. Cl. X.R.

280—402